(No Model.)
D. LEIGH.
CULTIVATOR SHOVEL.
No. 385,275. Patented June 26, 1888.
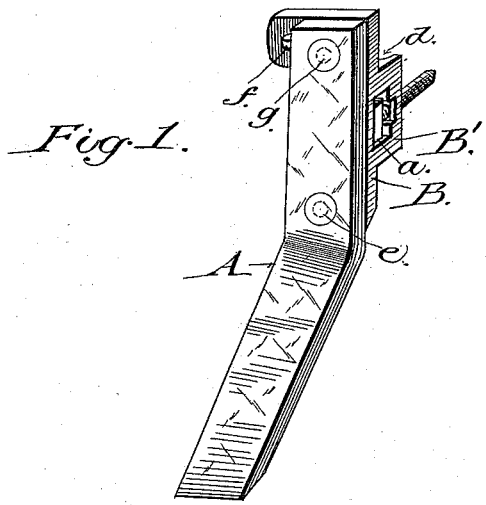
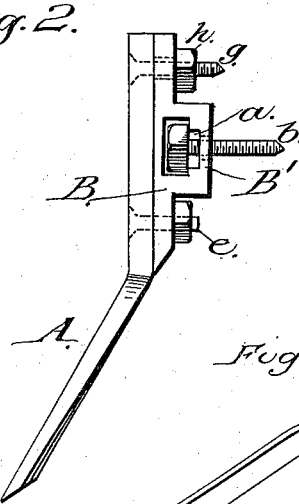
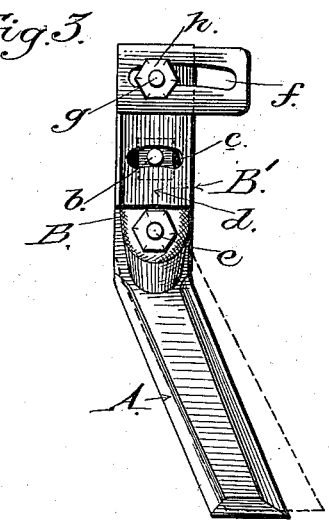
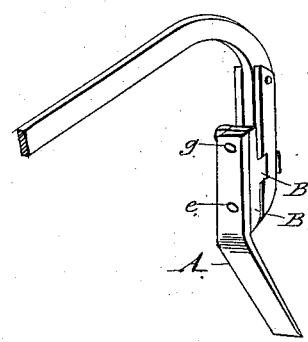
WITNESSES.
T. Walter Fowler
W. H. Patterson
INVENTOR,
Daniel Leigh,
by A. H. Evans & Co.
his Attorneys.

UNITED STATES PATENT OFFICE.

DANIEL LEIGH, OF GROVEPORT, OHIO.

CULTIVATOR-SHOVEL.

SPECIFICATION forming part of Letters Patent No. 385,275, dated June 26, 1888.

Application filed February 28, 1888. Serial No. 265,625. (No model.)

*To all whom it may concern:*

Be it known that I, DANIEL LEIGH, a citizen of the United States, residing at Groveport, in the county of Franklin and State of Ohio, have invented a certain new and useful Improvement in Cultivator-Shovels, of which the following is a full and clear description, reference being had to the accompanying drawings, forming part of this specification, in which—

Figure 1 represents a perspective view of one of my improved shovels detached from the beam. Fig. 2 is a side elevation of the same. Fig. 3 is a rear view. Fig. 4 is a perspective view showing the manner of applying the shovel to a beam.

My invention relates to certain improvements in the form of cultivator-shovels and in means whereby said shovels may be adjusted laterally; and my invention consists in the constructions and combinations of parts, which I shall hereinafter fully describe and claim.

To enable others skilled in the art to make and use my invention, I will now describe its construction and indicate the manner in which the same is carried out.

In the said drawings, A represents a tooth or shovel adapted for attachment to the standards of cultivators or plows, and having its lower portion bent forward, and also laterally to one side of its shank, whereby its point is enabled to cultivate the soil under the hill or row of grain being tilled. These shovels are preferably attached to the beam nearest the hill of grain to be tilled, although they may, if desired, be attached to other of the beams or standards of the plow, the main object being to so locate the shovels that their points will loosen up the ground and cultivate the soil under the hills or rows of grain without covering up or throwing clods of earth upon said hills or rows. By this construction the shovel has its point extending under the hill or row, while its upper portion or shank is nearly or quite perpendicular to the ground and is connected with a slotted plate, B, whereby said shovel may be adjusted to any desired degree or angle, either to the right or left.

The plate B is of peculiar construction, being formed with an enlargement, B', having a recess, *a*, within which a headed bolt, *b*, is passed, the said bolt having its threaded shank extending rearward through a curved slot, *c*, in the back of the plate, and is passed into and secured to the ordinary plow-standard (see Fig. 4) with which cultivators are generally supplied. By this means the shovel A may be readily secured to the ordinary cultivator or plow when desired, the curved seat *d* on the back of the plate B fitting against the front face of the cultivator-standard.

The plate B is pivoted at its lower end upon the bolt *e*, which secures it to the upper portion of the shovel, and at its upper end is provided with an elongated head having a curved slot, *f*, through which extends a threaded bolt, *g*, projecting from the rear upper face of the shovel. The outer end of this bolt *g* is engaged by a nut, *h*, or other securing device, whereby the plate B may be securely locked against the upper portion of the shovel after its point has been adjusted to the desired angle.

From this description it will be seen that when it is desired to adjust the point of the shovel either to the right or left the holding-nut *h* is loosened and the shovel moved in the desired direction, the bolts *b* and *g* and the slots *c* and *f* permitting this movement. When the point has been properly adjusted, the shovel may be secured in its new position by tightening up the nut *h*.

To detach the shovel from the cultivator-standard, the operator simply releases the bolt *b* from the standard, when the shovel and its attached slotted plate may be removed.

Having thus described my invention, what I claim as new, and desire to secure by Letters Patent, is—

The combination, with a cultivator-standard, of the plate B, having the recess *a* and the curved slots *c* and *f*, the headed bolt in the recess projecting through the slot *c* and securing the plate to the standard, and the bent shovel A, pivoted to the bottom of said plate and provided with a bolt, *g*, adapted to pass through the upper slot, *f*, whereby the shovel may be adjusted, and a nut engaging said bolt and securing the shovel to the plate, substantially as described.

DANIEL LEIGH.

Witnesses:
EARL LATHROP,
GEO. S. ARTZ.